US012216328B2

(12) United States Patent
Brown et al.

(10) Patent No.: US 12,216,328 B2
(45) Date of Patent: Feb. 4, 2025

(54) ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); Robert Langhorne, Cambridge (GB); James Howarth, Cambridge (GB); Robin Eddington, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 371 days.

(21) Appl. No.: 17/762,007

(22) PCT Filed: Jul. 6, 2020

(86) PCT No.: PCT/GB2020/051623
§ 371 (c)(1),
(2) Date: Mar. 18, 2022

(87) PCT Pub. No.: WO2021/005351
PCT Pub. Date: Jan. 14, 2021

(65) Prior Publication Data
US 2022/0357557 A1 Nov. 10, 2022

(30) Foreign Application Priority Data

Jul. 5, 2019 (GB) .................................. 1909722
Jul. 19, 2019 (GB) .................................. 1910421

(Continued)

(51) Int. Cl.
*G02B 7/09* (2021.01)
*F03G 7/06* (2006.01)
*G03B 5/02* (2021.01)

(52) U.S. Cl.
CPC ........... *G02B 7/09* (2013.01); *F03G 7/06143* (2021.08); *F03G 7/064* (2021.08); *F03G 7/0665* (2021.08);
(Continued)

(58) Field of Classification Search
CPC .... G03B 2205/0076; G03B 5/02; G03B 7/10; G03B 5/00; G02B 7/09; F03G 7/06143
See application file for complete search history.

(56) References Cited

U.S. PATENT DOCUMENTS 9,549,109 B2 * 1/2017 Kim ....................... H04N 23/57
2010/0074607 A1   3/2010 Topliss et al.
(Continued)

FOREIGN PATENT DOCUMENTS

CN   107450251 A * 12/2017 ........... G02B 27/646
EP   1959283 A1   8/2008
(Continued)

OTHER PUBLICATIONS

Great Britain Combined Search and Examination Report for Application No. GB1910767.1, dated Oct. 14, 2019 (6 pages).
PCT International Search Report for International Application No. PCT/GB2020/051623, mailed Sep. 30, 2020 (2 pages).

*Primary Examiner* — Christopher E Mahoney
(74) *Attorney, Agent, or Firm* — Van Hoven PC; Stefan D. Osterbur; Joshua Van Hoven

(57) ABSTRACT

An actuator assembly comprises: first (20) and second (10) parts, wherein a primary axis (P) is defined with reference to the second part; a plurality of lengths of shape-memory alloy wire (30) connected between the first and second parts, wherein the lengths of wire are configured, when selectively powered, to cause three-dimensional movement of the first part relative to the second part; and a mechanism configured, when the lengths of wire are unpowered, to hold the first part in at least one position and/or orientation relative to the (Continued)

second part against the force of gravity for any orientation of the second part.

27 Claims, 10 Drawing Sheets

(30) Foreign Application Priority Data

Jul. 29, 2019 (GB) .................................. 1910767
Oct. 23, 2019 (GB) .................................. 1915364

(52) U.S. Cl.
CPC ........ G03B 5/02 (2013.01); *G03B 2205/0076* (2013.01)

(56) References Cited

U.S. PATENT DOCUMENTS

| | | |
|---|---|---|
| 2010/0074608 A1 | 3/2010 | Topliss |
| 2010/0283887 A1 | 11/2010 | Topliss et al. |
| 2015/0152853 A1* | 6/2015 | Sicre ................ F03G 7/065 60/528 |
| 2018/0052381 A1* | 2/2018 | Koepfer ................ G03B 5/00 |

FOREIGN PATENT DOCUMENTS

| | | | |
|---|---|---|---|
| EP | 2372428 A1 | 10/2011 | |
| FR | 3011942 A1 * | 4/2015 | ............ G02B 23/02 |
| WO | 2011104518 A1 | 9/2011 | |
| WO | 2018073585 A1 | 4/2018 | |

* cited by examiner

ACTUATOR ASSEMBLY

CROSS-REFERENCE TO RELATED APPLICATIONS

This application is a national stage application under 35 U.S.C. § 371 of International Application PCT/GB2020/051623, filed Jul. 6, 2020, which claims priority of GB Patent Application Nos. 1909722.9, filed Jul. 5, 2019, 1910421.5, filed Jul. 19, 2019, 1910767.1, filed Jul. 29, 2019, and 1915364.2, filed Oct. 23, 2019, the disclosures of each of which are hereby incorporated by reference herein in their entireties.

FIELD

The present application relates to an actuator assembly, particularly an actuator assembly comprising a plurality of lengths of shape-memory alloy (SMA) wire.

BACKGROUND

WO 2011/104518 A1 describes an actuator assembly that uses SMA wires to move a movable element supported on a support structure, for example to provide optical image stabilisation. Eight SMA wires are arranged inclined with respect to a notional primary axis with a pair of the SMA wires on each of four sides around the primary axis. The SMA wires are connected so that on contraction two groups of four SMA wires provide a force with a component in opposite directions along the primary axis, so that the groups are capable of providing movement along the primary axis. The SMA wires of each group have 2-fold rotational symmetry about the primary axis, so that there are SMA wires opposing each other that are capable of providing lateral movement.

SUMMARY

According to a first aspect of the present invention, there is provided an actuator assembly comprising: first and second parts; a plurality of lengths of SMA wire connected between the first and second parts, wherein the lengths of wire are configured, when selectively powered, to cause three-dimensional (3D) movement of the first part relative to the second part; and a mechanism configured, when the lengths of wire are unpowered, to hold the first part in at least one position and/or orientation relative to the second part against the force of gravity for any orientation of the second part.

A number of advantages can follow from being able to hold the first part in this way.

The mechanism should be configured so as to avoid undue effects on the ability of the SMA wire to cause the 3D movement of the first part.

For example, the first part may correspond to the movable element, the second part may correspond to the support structure, and the plurality of lengths of SMA wire may correspond to the eight SMA wires described in WO 2011/104518 A1.

A primary axis (e.g. an optical axis) may be defined with reference to the second part.

The 3D movement may correspond, for example, to translational movement with three degrees of freedom.

The at least one position (in which the first part is held) may correspond to a range of positions. The range of positions may correspond to at least a portion of the first part having moved by a distance of <100 μm from a central position relative to the second part. The distance may be <50 μm or <25 μm.

The distance may be a lateral distance relative to the primary axis. Controlling such a distance is particularly important in some applications.

The mechanism may comprise: a set of one or more end stops formed on the second part; and a set of one or more resilient elements connected between the first and second parts to bias the first part such that, when the lengths of wire are unpowered, the first part moves into contact with the set of end stops. This can provide another effective way of implementing the mechanism.

The movement may be at least partly along the primary axis.

The set of end stops may comprise a first set of surface regions configured to contact a first set of surface regions of the first part to control the orientation of the first part relative to the primary axis.

The set of end stops may comprise a second set of surface regions configured to contact a second set of surface regions of the first part to control the lateral position of at least a portion of the first part relative to the primary axis.

The second sets of surface regions may define a taper to guide the first part to the at least one position and/or orientation from a range of positions and/or orientations associated with the 3D movement of the first part.

The first part may have first and second portions spaced from each other along the primary axis. The second sets of surfaces may be configured to control the lateral position of the second portion relative to the primary axis, and the set of resilient elements may be further configured to bias the first portion towards a central lateral position relative to the primary axis, thereby controlling the orientation of the first part relative to the primary axis.

The mechanism may comprise a set of one or more resilient elements connected between the first and second parts to bias the first part towards the at least one position and/or orientation. This can provide an effective way of implementing the mechanism.

At least one of the set of resilient elements may extend in one or more directions that are at least partly perpendicular to the primary axis. This can be advantageous because of space considerations.

The set of resilient elements may comprise two or more resilient elements that are spaced from each other along the primary axis. This can provide a relatively high stiffness in relation to rotations of the first part relative to the primary axis, which can be advantageous.

The set of resilient elements may produce a biasing force on the first part such that, for any orientation of the second part in which the primary axis is horizontal, at least a portion of the first part is a distance of 80 to 100 μm below a central position relative to the second part. The distance may be 40 to 50 μm or 16 to 20 μm. Thus, the biasing force can be just enough to achieve a particular degree of hold, in which case any effects on the ability of the SMA wire to cause the 3D movement of the first part can be minimised (or made suitably small).

One or more of the set of resilient elements may form part of an electrical connection to a moving end of each of the lengths of shape-memory alloy wire. Thus, one or more resilient elements may have a dual function, thereby reducing the number of components.

For ease of reference, an actuator assembly having one or more of the following features is hereinafter sometimes referred to as a second type of actuator assembly.

The mechanism may be configured to provide a non-linear biasing force that biases the first part towards the at least one position and/or orientation. The non-linear biasing force may be relatively large when the first part is in the at least one position and/or orientation, and the non-linear biasing force may be relatively small when the first part is in a range of positions and/or orientations associated with the 3D movement of the first part (e.g. a range associated with standard operation).

The mechanism may comprise a latch that couples the first and second parts when the first part is in the at least one position and/or orientation.

These mechanisms can be particularly suitable for minimising effects on the ability of the SMA wire to cause the 3D movement of the first part.

The actuator assembly may comprise control circuitry configured, before unpowering the lengths of wire, to move the first part to a position and/or orientation relative to the second part in which the non-linear biasing force is relatively large and/or in which the latch engages.

The mechanism may be configured to provide a non-linear biasing force that is larger than the force of gravity on the first part for any operational position and orientation of the first part relative to the second part. In such instances, control circuitry configured as specified above may not be needed.

The mechanism may comprise a magnetic element on each of the first and second parts. At least one of the magnetic elements may comprise a permanent magnet. The magnetic elements may be in proximity to each other when the first part is in the at least one position and/or orientation.

The permanent magnet may be a quadrupole magnet. Such a magnet has a field that decreases rapidly with increasing distance from the magnet and so is particularly suitable for producing the non-linear biasing force.

Optionally, the at least one position and/or orientation can be arrived at by a substantially translational movement of the first part along the primary axis from a central operational position and orientation of the first part relative to the second part. Hence the orientation, and the lateral position, of the first part relative to the primary axis can be the same in the at least one position and the central operational position. As will be explained below, this can enable a camera lens to be aligned with an optical axis in both these positions.

The central operational position and orientation may correspond to a position and orientation that maximises the range of the movement of the first part relative to the second part that can be caused by selective powering of the plurality of lengths of shape-memory alloy wire and may correspond to a central position within this range.

The first and second parts may each comprise a first set of end stop surface regions configured to contact each other to guide the first part to the at least one position and/or orientation.

The first and second parts may each comprise a second set of end stop surface regions configured to contact each other to define at least part of a wire protection envelope. The first set of end stop surface regions may truncate the wire protection envelope such that the at least one position and/or orientation is within the wire protection envelope.

The first and second parts may each comprise a set of end stop surface regions configured to contact each other to at least partly define the position of the first part along the primary axis when the first part is in the at least one position and/or orientation.

The mechanism may be configured to provide a non-linear biasing force that guides the first part to the at least one position and/or orientation. The first part may have first and second portions spaced from each other along the primary axis. The at least one position and/or orientation may correspond to a range of positions and orientations in which the first portion generally has a smaller range of positions than the second portion. It can be particularly important to control the position of a particular portion of the first part, i.e. the first portion. For example, the first portion may be more visible than the second portion when the actuator assembly is included in a device.

There may be provided an optical assembly comprising the actuator assembly. The first part may comprise a component of an optical system. The primary axis may correspond to an optical axis of the optical system.

There may be provided a camera assembly comprising the optical assembly. The first part may comprise a camera lens and the second part may comprise an image sensor.

Where the camera assembly comprises the second type of actuator assembly, the position and/or orientation of the camera lens relative to at least a portion of the mechanism may be at least partly defined so as to at least partly define the position and orientation of the camera lens relative to the optical axis when the first part is in the at least one position and/or orientation. The camera lens may have an orientation defined by a first axis and another portion of the first part may have an orientation defined by a second axis that is at an angle of greater than zero and less than e.g. ~5° relative to the first axis. In other words, the camera lens may be misaligned with the other portion of the first part. This enables the camera lens to be aligned with the optical axis when the first part is in the at least one position and/or orientation and in the operational central position—even where the other portion of the first part cannot be so aligned.

According to a second aspect of the present invention, there is provided a method of assembling the second type of actuator assembly, the method comprising:
 selectively powering the plurality of lengths of shape-memory alloy wire to move the first part to the at least one position and/or orientation; and
 while holding the first part in the at least one position and/or orientation, fixing a position and/or orientation of at least a portion of the mechanism relative to first part.

Moving the first part to the at least one position and/or orientation may comprise moving the first part to the operational central position and orientation, and then moving the first part along the primary axis to the at least one position and/or orientation.

Fixing the position and/or orientation of the at least the portion of the mechanism may comprise positioning at least one of the magnetic elements such that the magnetic elements are in proximity to each other.

Fixing the position and/or orientation of the at least the portion of the mechanism may comprise adhering at least one of the magnetic elements to the first and/or second part.

There may be provided a method of assembling a camera assembly comprising the second type of actuator assembly, the method comprising: a method according to the second aspect of the present invention; and, while the first part is held in the at least one position and/or orientation by the mechanism, fixing a position and/or orientation of the camera lens relative to the optical axis.

Thus, the camera lens can be aligned with an optical axis when the first part is in the operational central position and orientation without having to selectively power the plurality of lengths of shape-memory alloy wire.

Fixing the position and/or orientation of the camera lens may comprise adhering the camera lens to a portion of the first part.

According to a third aspect of the present invention, there is provided a method of operating the actuator assembly or camera assembly, the method comprising:

calibrating one or more offsets based on measurements of the resistance of one or more of the lengths of shape-memory alloy wire while the first part is in the at least one position and/or orientation, wherein the offsets are for adjusting one or more aspects of a control scheme such that actual positions and/or orientations of the first part relative to the second part substantially match target positions and/or orientations in respect of at least one degree of freedom.

The method may comprise carrying out the measurements of the resistance at least partly as part of a power up procedure and before moving the first part to an operational position.

The method may comprise carrying out the measurements of the resistance partly during manufacture of the actuator assembly.

The method may comprise determining a change in at least one of the one or more offsets based on a change in at least one of the measured resistances or a change in the response of a measured resistance to a known drive signal.

The method may comprise calibrating the one or more offsets based on measurements of the resistance of one or more of the lengths of shape-memory alloy wire while the first part is in a further position and/or orientation.

The first part may comprise a camera lens and the second part may comprise an image sensor. The further position and/or orientation may correspond to a position and/or orientation of the camera lens relative to the image sensor which is determined based on properties of an image formed on the image sensor by way of the camera lens.

The at least one degree of freedom may include rotations of the first part with respect to the second part about at least one axis perpendicular to the primary axis.

The method may comprise controlling the three-dimensional movement using the control scheme.

Controlling the three-dimensional movement may comprise:

setting target resistance values representing a desired position of the first part with respect to the second part;
detecting measures of resistance of each length of shape-memory alloy wire;
deriving errors from the target resistance values and the detected measures of resistance, the errors being adjusted by the offsets; and
controlling the powers of drive signals supplied to lengths of shape-memory alloy wire in accordance with the adjusted errors.

BRIEF DESCRIPTION OF THE DRAWINGS

Certain embodiments of the present invention will now be described, by way of example only, with reference to the accompanying drawings, in which.

DETAILED DESCRIPTION

First Assembly

Figure 1:
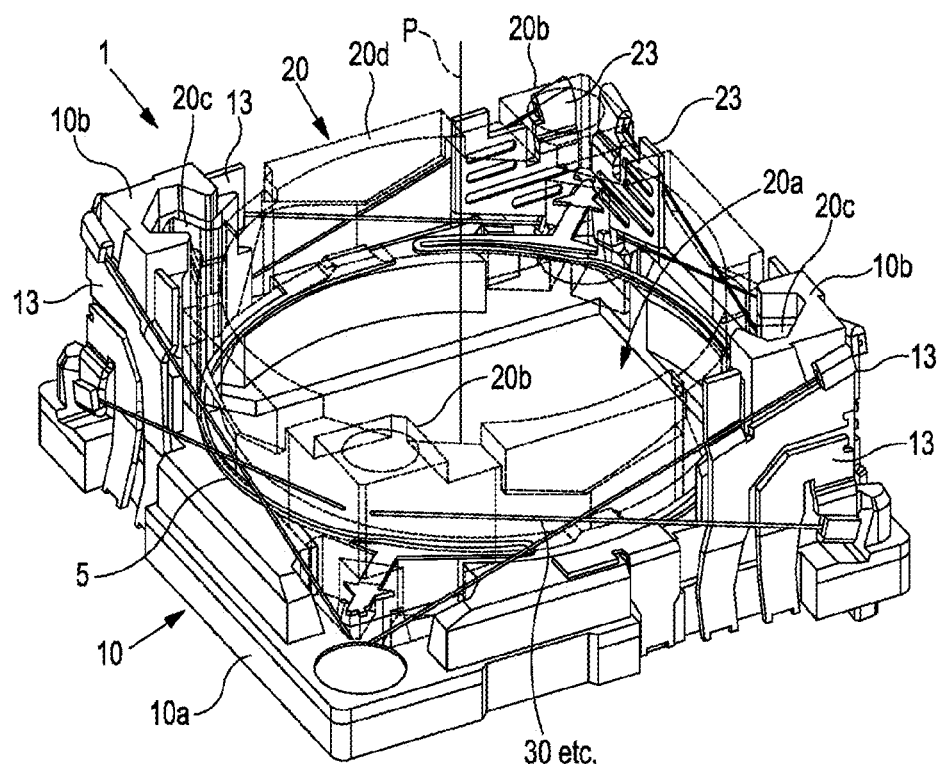
FIG. 1 is a perspective view of an example of an actuator assembly.

Referring to FIGS. 1 to 4, a first example of an actuator assembly 1 suitable for use in a miniature camera will now be described.

The actuator assembly 1 includes a static part 10 and a moving part 20. The moving part 20 has a cylindrical opening 20a for holding a camera lens 25 (shown in FIG. 4 only). The camera lens 25 includes a lens or an assembly of lenses. Hence the moving part 20 is hereinafter referred to as a lens holder. As described in more detail below, the lens holder 20 is supported on the static part 10 by eight SMA wires 30. The lens holder 20 is capable of movement with respect to the static part 10, driven by the SMA wires 30, with six degrees of freedom, i.e. three orthogonal translational degrees of freedom and three orthogonal rotational degrees of freedom.

The position and orientation of various features of the actuator assembly 1 can be conveniently described with reference to a primary axis P defined with reference to the static part 20. Broadly speaking, the primary axis P corresponds to an axis of (two-fold) rotational symmetry of the actuator assembly 1. The primary axis P typically corresponds to the optical axis of the camera lens 25 when it is centrally arranged in the actuator assembly 1.

The actuator assembly 1 includes a set of two arms 5 connecting the static part 10 to the lens holder 20. Amongst other things, the arms 5 provide an electrical connection from the static part 10 to the moving ends of the SMA wires 30 (i.e. the ends of the SMA wires 30 connected to the lens holder 20). Hence the arms 5 are sometimes referred to as common connections.

Figure 2:
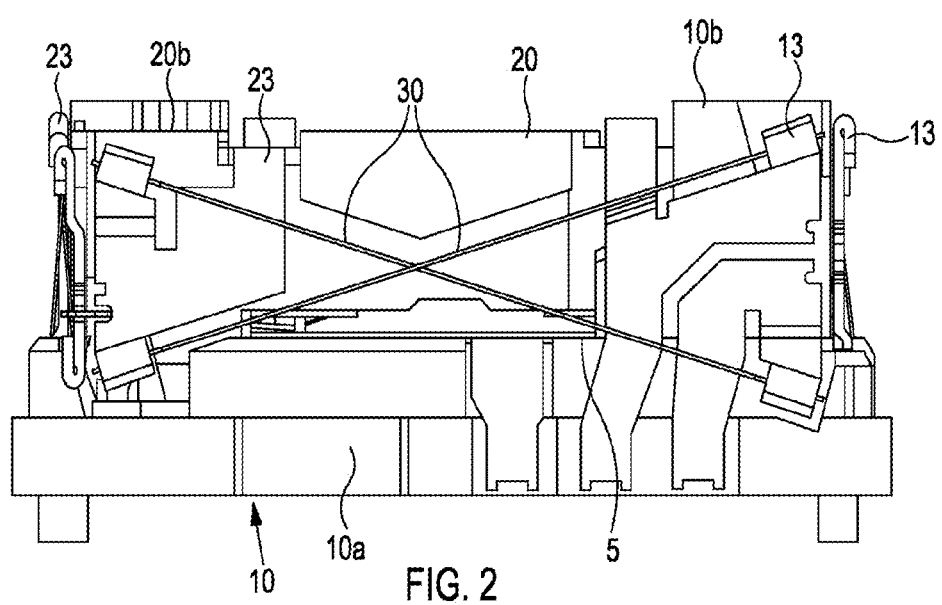
FIG. 2 is a side view of the actuator assembly of FIG. 1.
Figure 3:
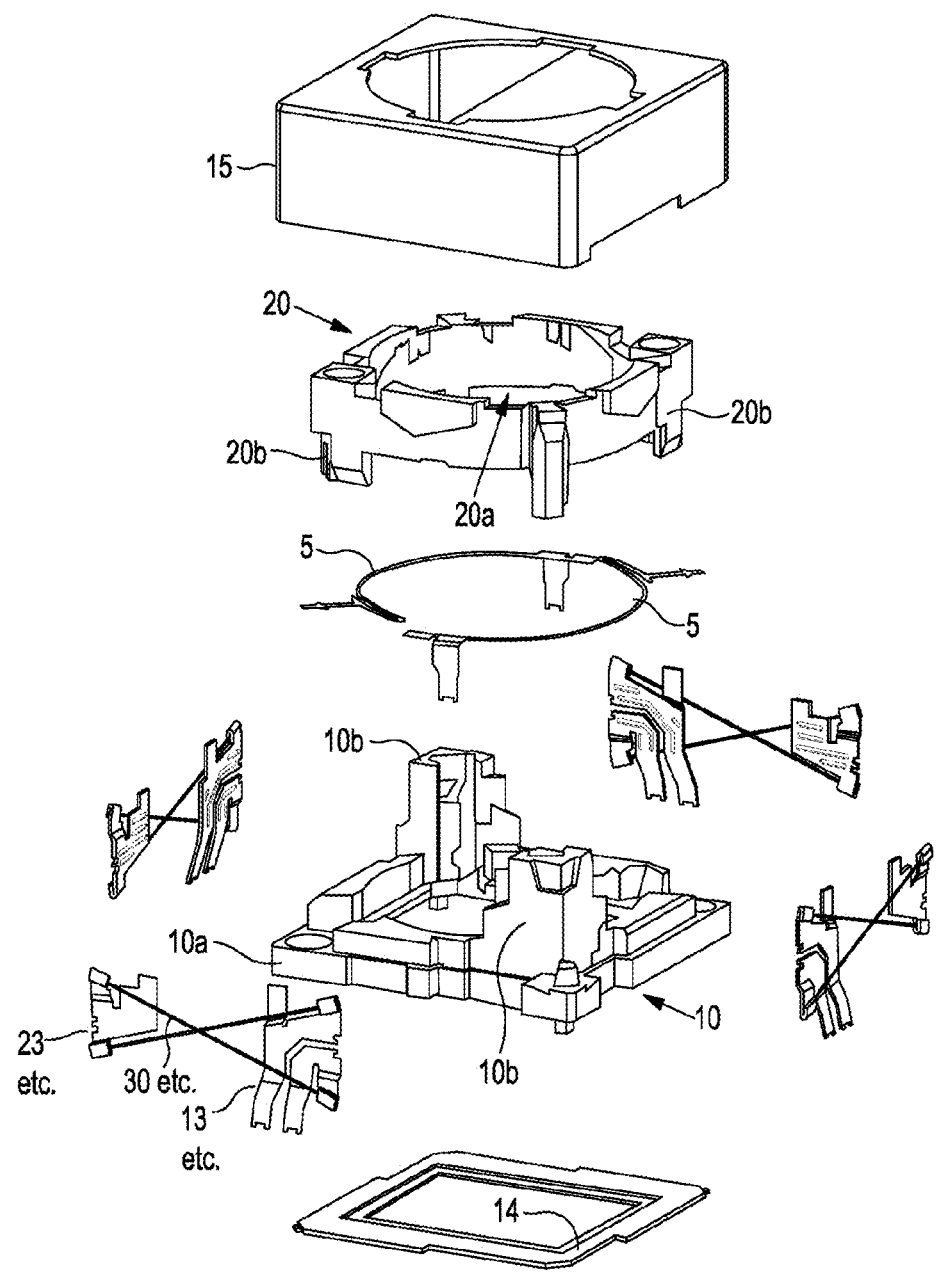
FIG. 3 is an exploded perspective view of the actuator assembly of FIG. 1.
Figure 4:
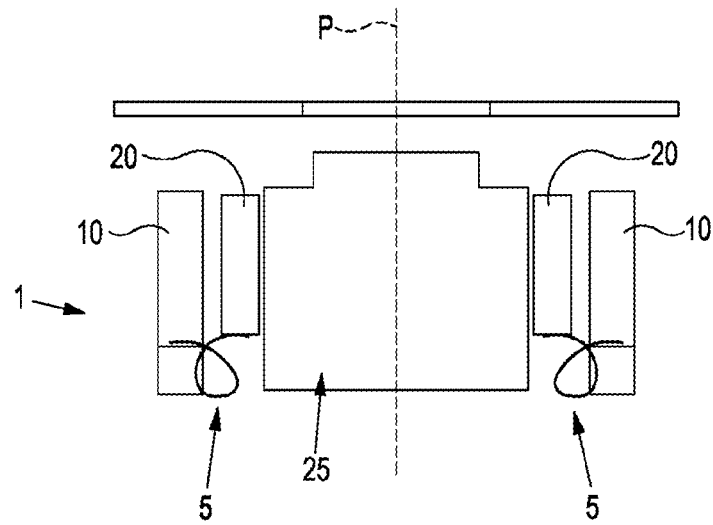
FIG. 4 is a schematic view of the actuator assembly of FIG. 1.

The actuator assembly 1 also includes a shield layer 14 and a screening can 15 (omitted from FIGS. 1 and 2). These components 14, 15 are affixed to the static part 10. The screening can 15 extends around the lens holder 20 with enough clearance to allow for movement of the lens holder 20. The screening can 15 protects the actuator assembly 1 against physical damage and the ingress of dust.

The static part 10 includes a base plate 10a and two static posts 10b provided on opposite corners of the base plate 10a. The static posts 10b may be affixed to the base plate 10a or formed integrally with the base plate 10a as one piece. Two crimp assemblies 13 are affixed to each of the two static posts 10b. The base plate 10a is configured to hold an image sensor (not shown).

The lens holder 20 includes two moving posts 20b aligned with the corners of the base plate 10a intermediate the static posts 10b. Two crimp assemblies 23 are affixed to each of the two moving posts 20b. (Two of the crimp assemblies 23 are omitted from FIG. 1.)

The SMA wires 30 are connected between the static part 10 and the lens holder 20 by being crimped at one end to a crimp assembly 13 of the static part and at the other end to a crimp assembly 23 of the lens holder 20. The crimp assemblies 13, 23 serve as both mechanical and electrical connections. The crimp assemblies 23 on the same moving post 20b are both electrically connected to one of the arms 5 (i.e. a common connection).

The SMA wires 30 have the same configuration around the lens holder 20 as the SMA wires in the actuator assembly described in WO2011/104518 A1. Specifically, two SMA wires 30 are arranged on each of four sides around the primary axis P, and are inclined with respect to the primary axis P (i.e. at an acute angle greater than 0°) in opposite senses to each other and crossing each other, as viewed perpendicular to the primary axis P. Thus, in particular, each of the SMA wires 30 is inclined with respect to the primary axis P and with respect to each other. Reference is made to WO 2011/104518 A1 for further details of the arrangement of the SMA wires 30.

Selective contraction of the SMA wires 30 can drive movement of the lens holder 20 in any of the six degrees of freedom. Such movement is hereinafter sometimes referred to as three-dimensional (3D) movement. Contraction and expansion of the SMA wires 30 is generated by selectively applying drive signals thereto. The SMA wires 30 are resistively heated by the drive signals and cool by thermal conduction to the surroundings when the power of the drive signals is reduced.

Thus, the SMA wires 30 may be used to provide both an autofocus (AF) function by translational movement of the lens holder 20 along the primary axis P and a primary image stabilisation (OIS) function by translational movement of the lens holder 20 perpendicular to the primary axis P.

The drive signals may be generated by control circuitry (not shown) and supplied to the SMA wires 30. Such control circuitry may receive an input signal representing a desired position for the lens holder 20 and generates drive signals having powers selected to drive the lens holder 20 to the desired position. The power of the drive signals may be either linear or varied using pulse width modulation. The drive signals may be generated using a resistance feedback control technique, in which case the control circuitry measures the resistance of the SMA wires 30 and uses the measured resistance as a feedback signal to control the power of the drive signals.

In this example, the set of arms 5 is further configured to produce a biasing force to bias the lens holder 20 towards a position in which the lens holder 20 (particularly the cylindrical opening 20a for holding the camera lens 25) is centered on, and aligned with, the primary axis P. This position and orientation of the lens holder is hereinafter referred to as the central arrangement. The arms 5 are configured to hold the lens holder 20 together with the camera lens 25 in substantially the central arrangement when the SMA wires 30 are not being driven. Moreover, the arms 5 are configured to do this for any orientation of the actuator assembly 1. In particular, the arms 5 are configured to produce a biasing force such that the lens holder 20 remains within a particular range of positions and orientations around the central arrangement in these circumstances. As will be appreciated, the required biasing force will depend on the weight of the camera lens 25 (and any other components on the lens holder 20). The range of positions and orientations may, for example, correspond to at least a portion of the lens holder 20 moving by no more than a specified distance of e.g. 100 μm from its position when the lens holder 20 is in the central arrangement. The specified distance may be a lateral distance relative to the primary axis P. The portion of the lens holder 20 for which the distance is specified may be, for example, the upper surface 20d of the lens holder 20, because this determines the view of e.g. the camera lens 25 that is visible to a user when the camera is included in a device (see in particular FIG. 4).

At the same time, the biasing force produced by the arms 5 should not overly affect the 3D movement of the lens holder 20 caused by the selective contraction of the SMA wires 30 (this movement is hereinafter referred to as 'operational movement'). As will be appreciated, the biasing force in any given direction cannot exceed the maximum force that can be exerted by the SMA wires 30 in the opposite direction. In practice, the biasing force may be considerably lower than this upper limit. Accordingly, the arms 5 should be configured to produce just enough biasing force to achieve a particular degree of hold. For example, for any orientation of the actuator assembly 1 in which the primary axis P is horizontal, the arms 5 may be configured to produce a biasing force such that a portion of the lens holder 20 (e.g. the upper surface 20d) is a distance of 80 to 100 μm below a central position. The biasing force is preferably substantially symmetric, e.g. in lateral directions relative to the primary axis P.

The arms 5 may have any suitable properties to produce a biasing force as described above.

In this example, the arms 5 lie within a planar region that is perpendicular to the primary axis P. Broadly speaking, each arm 5 extends part way (e.g. just less than ~180°) around a circle centered on the primary axis P. More specifically, each arm 5 extends first in one direction (e.g. clockwise) and then extends around a hairpin bend and then extends in the other direction (e.g. anticlockwise).

In other examples, there may be a different (e.g. larger) number of arms 5 and/or each arm 5 may follow a different path.

The arms 5 may also be made of any suitable (resilient) material and/or may have any suitable cross section.

Second Example

Figure 5:
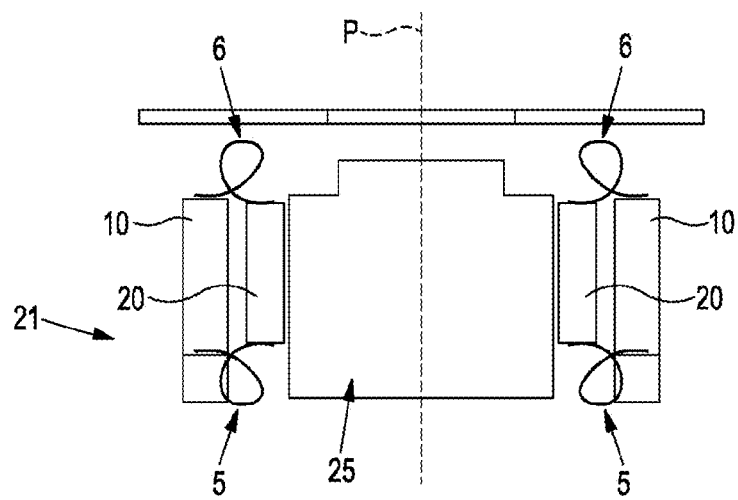
FIG. 5 is a schematic view of another example of an actuator assembly.

Referring to FIG. 5, a second example of an actuator assembly 21 will now be described.

The actuator assembly 21 includes the same features as in the first example and also includes a further ('second') set of arms 6 connecting the static part 10 to the lens holder 20.

The second set of arms 6 lie in a ('second') planar region that is perpendicular to the primary axis. The second planar region is spaced from the ('first') planar region in which the first set of arms 5 lie. For instance, the first set of arms 5 may be positioned towards the lower end of the actuator assembly 21 and the second set of arms 6 may be positioned towards the upper end of the actuator assembly 21 (wherein 'upper' and 'lower' are defined for an actuator assembly 21 orientated such that the primary axis P is vertical, as illustrated in the figures).

Otherwise, the second set of arms 6 may be substantially the same as the above-described ('first') set of arms 5, e.g. they may be the same in number, may follow the same path within the relevant planar region, may be made of the same material and/or may have the same cross-section.

The first and second sets of arms 5, 6 are together configured to produce a biasing force to bias the lens holder 20 towards the central arrangement in a similar way to that described above in relation to the first example.

In this example, because there are arms 5, 6 spaced along the primary axis P, the arms 5, 6 are more effective at limiting tilt of the lens holder 20 relative to the primary axis. In other words, the lens holder 20 can be held within a given range of orientations around the central arrangement and, moreover, this can be achieved with each individual set of arms 5, 6 generally having a lower stiffness (and therefore a reduced effect on the operational movement of the lens holder 20).

The second set of arms 6 may produce a different strength of biasing force from the first set of arms 5. In particular, the second set of arms 6 may be stiffer than the first set of arms 5. Accordingly, the portion of the lens holder 20 to which the second set of arms 6 is attached (i.e. an 'upper portion') may be held more centrally than the portion of the lens holder 20 to which the first set of arms 5 is attached (i.e. a 'lower portion'). This is advantageous because, as mentioned above, the position of such an upper portion determines the view of e.g. the camera lens 25 that is visible to a user when the camera is included in a device.

In some examples, the first set of arms 5 may produce a relatively weak biasing force and may be predominantly for providing the electrical connection to the moving ends of the SMA wires 30.

In some examples, there may be only one set of arms which is connected to an upper portion of the lens holder 20 and which provides the electrical connection. However, for certain technical reasons, it may not be desirable to position the common connection(s) near the top of the lens holder.

There may be more than two sets of arms and each set may include any number of arms.

Third Example

Figure 6:
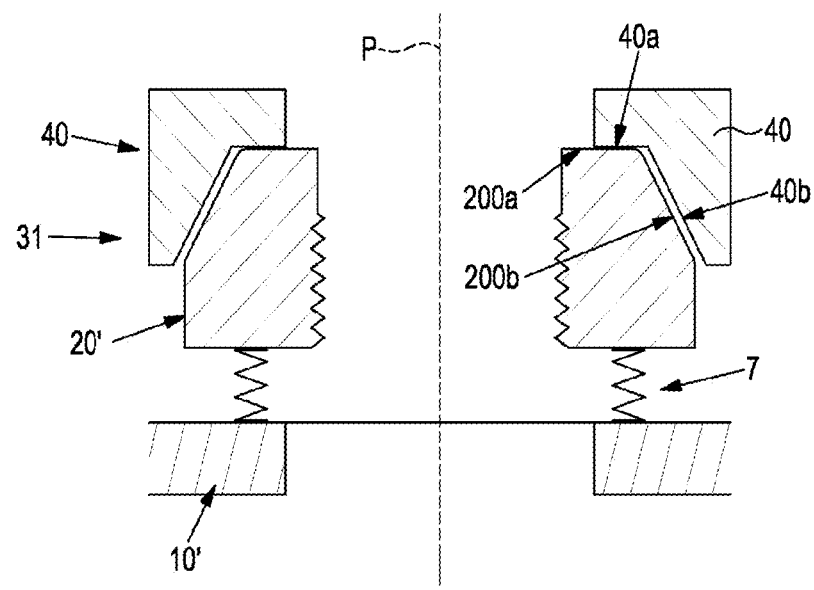
FIG. 6 is a schematic view of another example of an actuator assembly.

Referring to FIG. 6, a third example of an actuator assembly 31 will now be described.

The actuator assembly 31 includes the same or similar features as in the first example. However, the arms 5' may be merely for providing the electrical connection to the moving ends of the SMA wires 30 and need not produce the above-described biasing force. Rather, in this example, the actuator assembly 31 includes a set of springs 7 and a set of end stops 40 which together hold the lens holder 20' in the desired way, i.e. in substantially the central arrangement when the SMA wires 30 are not being driven and for any orientation of the actuator assembly 31.

The springs 7 are connected between the static part 10' and the lens holder 20' and are configured to bias the lens holder 20' such that, when the SMA wire 30' are not being driven, the lens holder 20' moves into contact with the end stops 40. In this example, the springs 7 are connected to a lower portion of the lens holder 20' and bias the lens holder 20' in an upwards direction along the primary axis P such that an upper portion of the lens holder 20' engages with the end stops 40.

The end stops 40 include a first set of surface regions 40a which contact a first set of surface regions 200a of the lens holder 20' to urge the lens holder 20' into alignment with the primary axis P. In this example, the first sets of surfaces 40a, 200a are planar and are oriented perpendicular to the primary axis P.

The end stops 40 includes a second set of surface regions 40b which contact a second set of surface regions 200b of the lens holder 20' to control the lateral position of the upper portion of the lens holder 20' relative to the primary axis P. Moreover, the second sets of surface regions 40b, 200b define a taper to guide the lens holder 20' to its final position and/or orientation from any operating position and/or orientation, i.e. when the SMA wires 30 are being selectively driven. In this example, the second sets of surface regions 40b, 200b correspond to portions of the surface of a cone whose primary axis corresponds to the primary axis P.

In some examples, the first or the second sets of surfaces 40a, 200a, 40b, 200b may be omitted.

The end stops 40 may be attached to, or formed from part of, the static part 10 and/or the screening can 15.

The springs 7 may have any suitable properties to bias the lens holder 20' as described above. Compared to the arms 5 and/or 6 in the first and second examples, the stiffness of the springs 7 may be relatively low, particularly in directions perpendicular to the primary axis P, and so the effect on the operational movement of the lens holder 20' may also be relatively low.

In some examples, rather than there being separate springs 7, the arms 5 may perform the function of the springs 7 while also providing the electrical connection to the moving ends of the SMA wires 30.

Fourth Example

Figure 7:
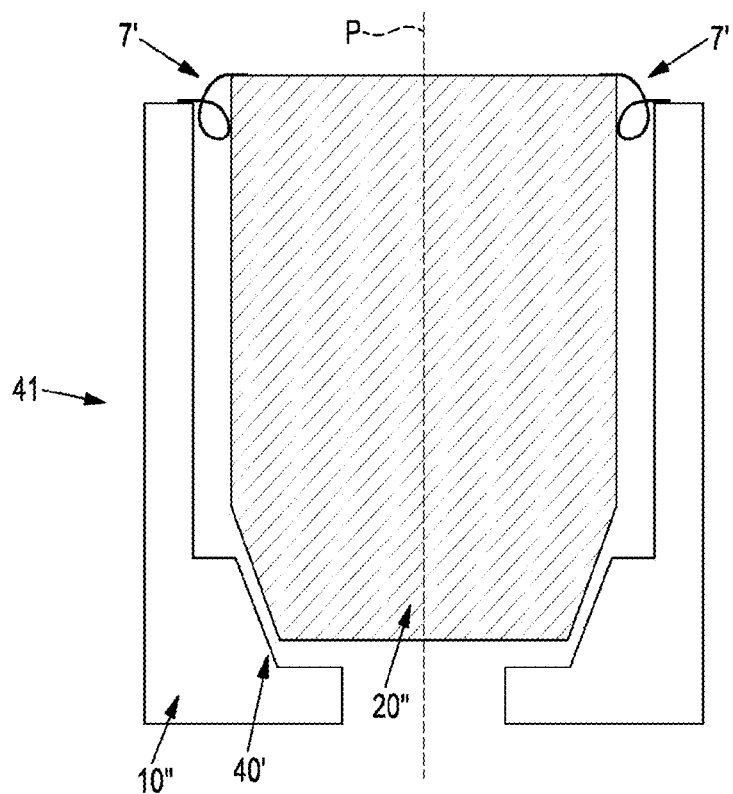
FIG. 7 is a schematic view of another example of an actuator assembly.

Referring to FIG. 7, a fourth example of an actuator assembly 41 will now be described.

The fourth example of the actuator assembly 41 is broadly similar to third example except that the springs 7' are connected to an upper portion of the lens holder 20" and bias the lens holder 20" in a downwards direction along the primary axis P such that a lower portion of the lens holder 20" engages with the end stops 40'.

In this example, the springs 7' also bias the upper portion of the lens holder 20" towards a central position laterally relative to the primary axis P.

In the third example, if the end stop 40 is some distance from the top (i.e. front) of the actuator assembly 31, then rotation of the lens holder 20' when it is in contact with the end stop 40 will result in e.g. the top of the camera lens being mispositioned. The biasing force may need to be large in order to ensure that the top of the camera lens does not move under the influence of gravity and this high force may compromise the performance of the actuator. In the fourth example, this is addressed by placing the springs 7' near the top of the actuator assembly 41 and using a lateral stiffness of the springs 7' to help ensure that the top of the camera lens remains in the desired position.

Fifth Example

Figure 8A:
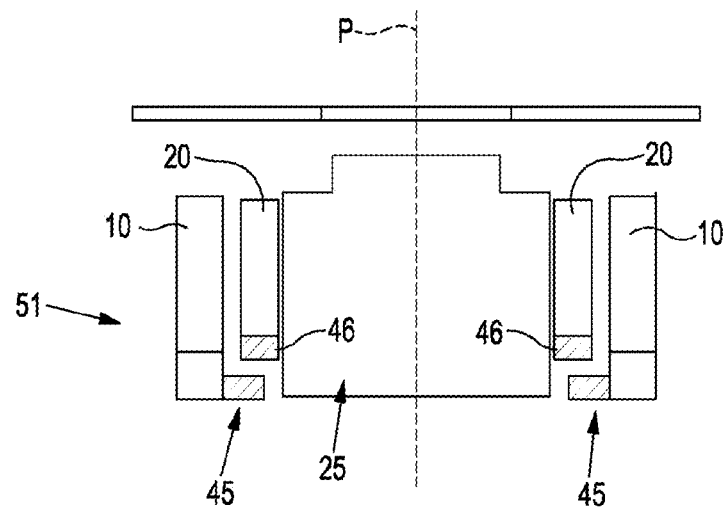
FIG. 8 is a schematic view of another example of an actuator assembly in an operation position (A) and in a held position (B)
Figure 8B:
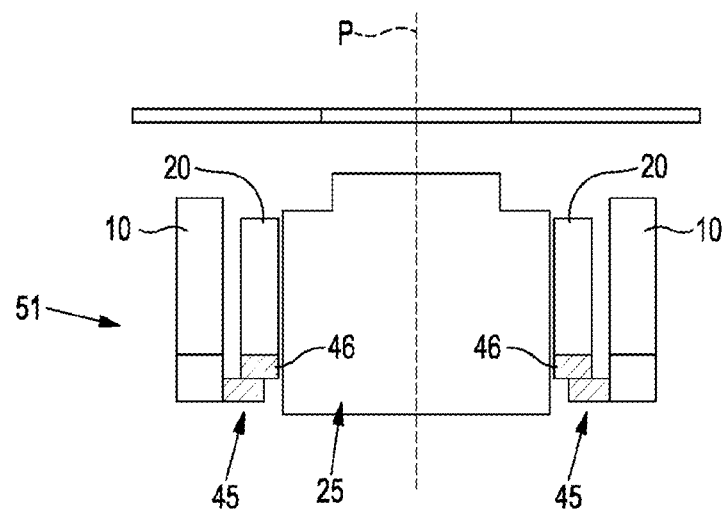

Referring to FIGS. 8A and 8B, a fifth example of an actuator assembly 51 will now be described.

The actuator assembly 51 includes the same or similar features as in the first example. However, the arms 5' may be merely for providing the electrical connection to the moving ends of the SMA wires 30 and need not produce the above-described biasing force. Rather, in this example, the actuator assembly 51 includes magnetic elements 45, 46 on each of the static part 10 and the lens holder which together hold the lens holder 20 in the desired way.

In this example, there are a set of e.g. three permanent magnets 45 attached to the static part 10 and a set of three corresponding regions 46 of a ferromagnetic material e.g. steel attached to, or formed as part of, the lens holder 20. In other examples, the permanent magnets 45 may instead be attached to the lens holder 20 and the regions 46 of the ferromagnetic material may be attached to, or formed as part of, the static part 10.

The permanent magnets 45 may be magnetic quadrupoles, which may have a size that is comparable to the distance over which it was desirable for the magnetic force to act. Typically, this might be a few hundred microns.

The magnetic elements 45, 46 on the respective parts are relatively far from each other (and hence the forces between them are relatively low) when the lens holder 20 is in its range of operating positions and/or orientations (see FIG. 8A). Hence the magnetic elements 45, 46 do not affect in any significant way the operational movement of the lens holder 20.

The magnetic elements 45, 46 on the respective parts are relatively close to, or are in contact with, each other (and hence the forces between them are relatively high) when the lens holder 20 is in a held position (see FIG. 8B).

In this example, the magnetic forces are larger than the force of gravity on the lens holder 20 for any operational position and orientation of the lens holder 20 relative to the static part 10. Hence the lens holder 20 can be pulled into the held position whenever the SMA wire 30 is unpowered.

In some other examples, the actuator assembly 51 is to for use with, or includes, control circuitry configured, before unpowering the SMA wire 30, to move the lens holder 20 into the held position (or sufficiently close to a held position that the magnetic forces are high enough to pull the lens holder 20 into the held position).

In this example, the parts 10, 20 each comprise a set of end stop surface regions configured to contact each other to at least partly define the position of the lens holder 20 along the primary axis P when the first part is in the held position. For example, the end stop surface regions may be planar ('flat') and perpendicular to the primary axis, as illustrated. In such examples, the magnetic forces can guide the lens holder 20 to the relevant position and/or orientation on the 'flat' end stops, i.e. to the held position.

Instead of magnetic elements, in some examples, the actuator assembly 51 may include another mechanism for providing a non-linear biasing force as described above. In some examples, the actuator assembly 51 may have a latch mechanism (e.g. a mechanical latch) that connects the static part 10 and the lens holder 20 when the lens holder 30 is brought (close) to the held position by the control circuitry.

Sixth Example

Figure 9A:
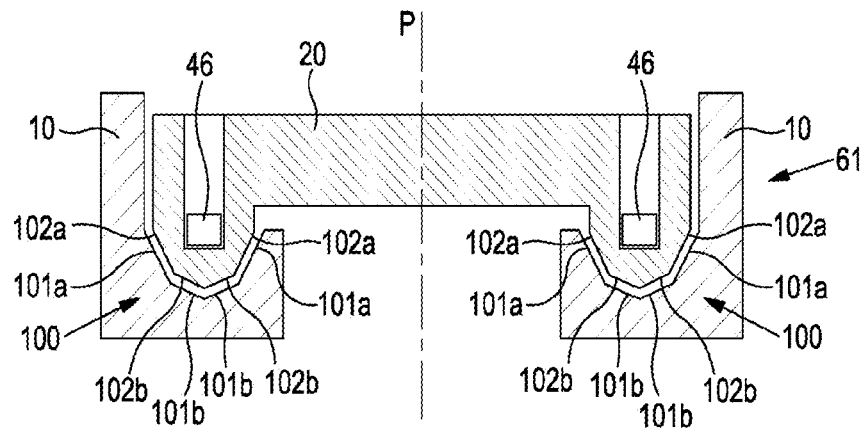
FIG. 9 is a schematic view of another example of an actuator assembly in an operation position (A), in a position corresponding to a maximum operating movement (B) and in a held position (C)
Figure 9B:
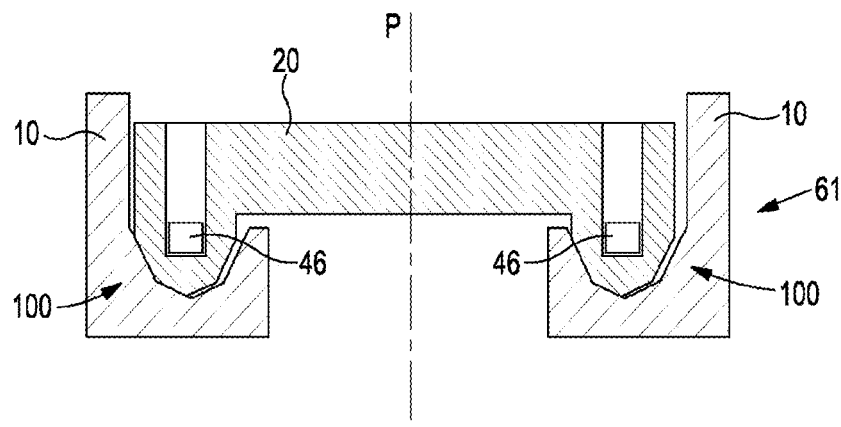
Figure 9C:
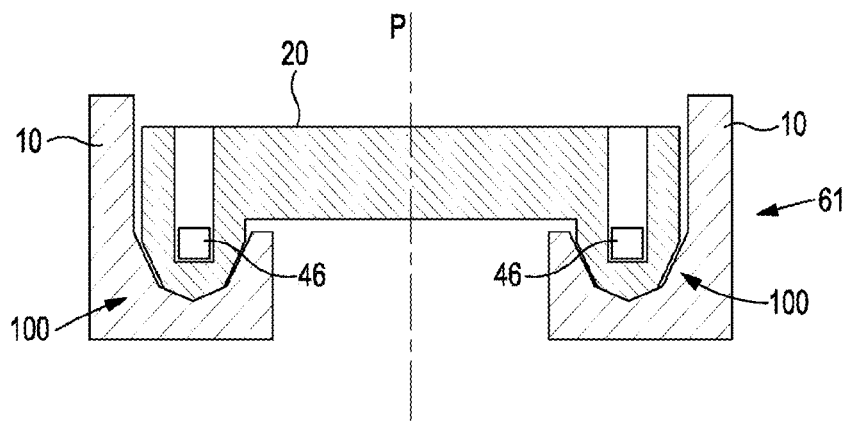
Figure 10:
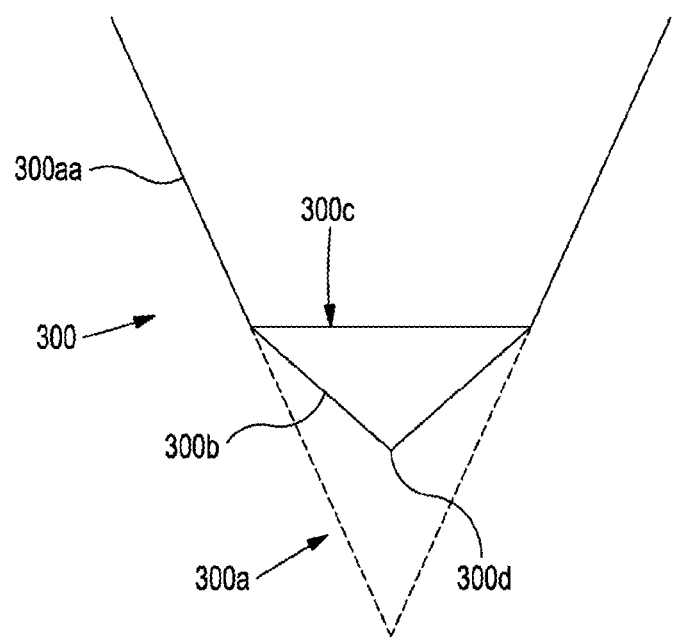
FIG. 10 illustrates an envelope of movement of the lens holder of the actuator assembly of FIG. 9.

Referring to FIGS. 9 and 10, a sixth example of an actuator assembly 61 will now be described.

The actuator assembly 61 includes the same features as the fifth example, notably the magnetic elements (although only the magnetic elements 45 on the lens holder 20 are shown). The actuator assembly 61 further includes a set of end stops 100.

The end stops 100 define the lower part of the envelope 300 of movement of the lens holder 20. One or more further end stops (not shown) define the remainder of this envelope 300.

Each of the end stops 100 is formed from surface regions 101a, 101b on the static part 10 that are partly upward-facing (for the illustrated orientation of the actuator assembly 61) and surface regions 102a, 102b on the lens holder 20 that are partly downward-facing.

The end stop surface regions on the static part 10 include a first set of regions 101a and second sets of regions 101b. Similarly, the end stop surface regions on the lens holder include a first set of regions 102a and second sets of regions 102b. In use, the first sets of regions 101a, 102a can engage with each other, and the second sets of regions 101b, 102b can engage with each other In this example, the end stop surface regions correspond to surfaces of (truncated) cones, the axes of which are parallel to the primary axis P. In other examples, one or more of the end stops 100 may have flat surface regions that form channels with the same cross-section as that illustrated in FIG. 9. Flat surfaces may be preferably for bearing stress and/or dust generation.

The first set of regions 101a, 102a are at a smaller angle relative to the primary axis P and are spaced further from the central axis of each end stop 100. In contrast, the second set of regions 101b, 102b are at a greater angle relative to the primary axis P and extend to a point on the central axis of each end stop 100.

The first set of regions 101a, 102a define part 300aa of a 'wire protection' envelope 300a in which SMA wires 30 are safe from damage e.g. due to over-extension. In conventional actuators, the wire protection envelope 300a is truncated horizontally e.g. by a horizontal end stop surface, thereby defining (the lower part) of an operating envelope (see feature 300c in FIG. 10). In this example, the wire protection envelope 300a is truncated by the second sets of surface regions 101b, 102b (see feature 300b in FIG. 10), which act to guide the lens holder 20 to a central point 300d. The central point 300d lies below the horizontal envelope 300c of the conventional actuator (and so below a typical operating envelope) and above the wire protection envelope 300a (and so is safe for the SMA wires 30).

The second sets of regions 101b, 102b help guide the lens holder 20 into and out of a central, low position in which the magnetic elements are in proximity to each other, i.e. a held position. Hence the second sets of regions 101b, 102b assist with the 'parking' of the lens holder 20 which, as explained above, is carried out using the SMA wires 30 before the SMA wires 30 are unpowered.

The second sets of regions 101b, 102b reduces the amount of Z-axis travel needed to park the lens holder 20, and therefore reduces the amount of space that is needed for the actuator 61, while also reducing the risk of strain damage to the SMA wires 30 in the region of extra Z-axis travel.

In other examples, instead of being combined in single end stops 100, the first sets of surface regions 101a, 102a may be separate from the second sets of surface regions 101a, 102a, while still providing a similar envelope 300.

Assembly Method

Figure 11A:
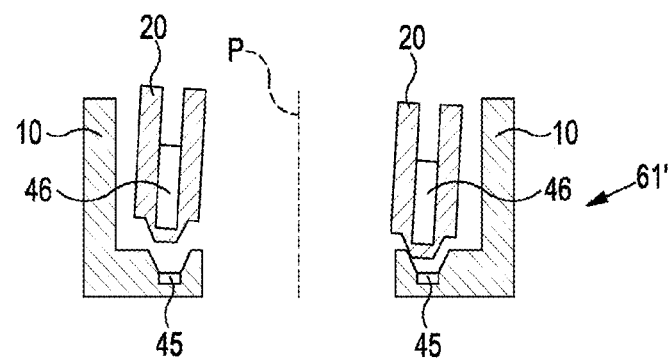
FIGS. 11A, B and C are schematic views of an example of a camera assembly at several different stages of assembly.
Figure 11B:
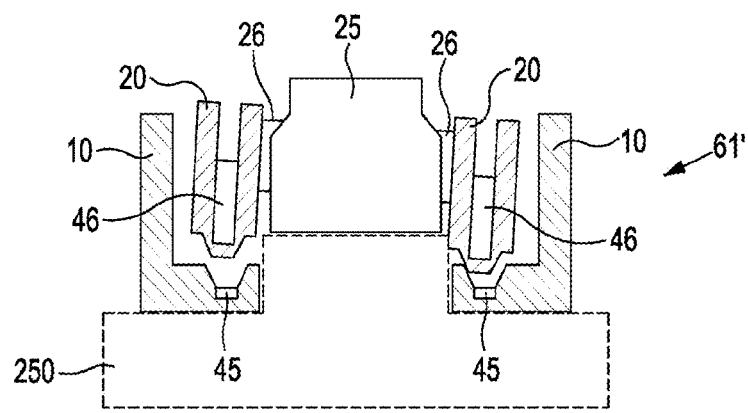

Referring to FIG. 11, an example of a method of assembling part of a camera assembly (i.e. an actuator assembly 61' and a lens assembly 25) will now be described. Here, the actuator assembly 61' is similar to the sixth example of the actuator assembly 61, i.e. includes magnetic elements 45, 46 on each of the static part 10 and the lens holder 20.

At a first step (see FIG. 11A), the lens holder 20 is held in a position and orientation hereinafter referred to the 'operational centre'. This may be achieved by selectively powering the SMA wires 30. The operational centre may correspond to the position and orientation which maximises the range of (translational) movement of the lens holder 20 that can be caused by the SMA wires 30 and, moreover, may correspond to a central position within this range. Alternatively, the operational centre may be an approximation of such a position and orientation. The operational centre may be defined in any suitable way, for example with reference to target resistances of the SMA wires 30. Due to variations in e.g. the tensions of the SMA wires 30 after they have been attached between the static part 10 and the lens holder 20, the operational centre will generally not correspond to an arrangement in which the lens holder 20 is centered on, and aligned with, the primary axis P. For example, the operational centre may correspond to a main axis of the lens holder 20 being misaligned with the primary axis P by up to ~1°.

At a second step (see FIG. 11B), with the lens holder 20 held by the SMA wires 30 at the operational centre, the lens assembly 25 is introduced (if it has not already been so), arranged in a desired position and orientation using a jig 250, and attached to the lens holder 20. The desired position and orientation corresponds to the lens assembly 25 being arranged relative to the static part 10 such that it is substantially parallel with the primary axis P. The lens assembly 25 may also be arranged in a substantially central lateral (and vertical) position. The jig 250 may have any suitable shape that achieves this. The lens assembly 25 may be attached to the lens holder 20 by way of a curable adhesive 26 which is cured at this stage.

Reference is made to WO 2018/073585 A1 for further details relevant to the above-described steps.

Figure 11C:
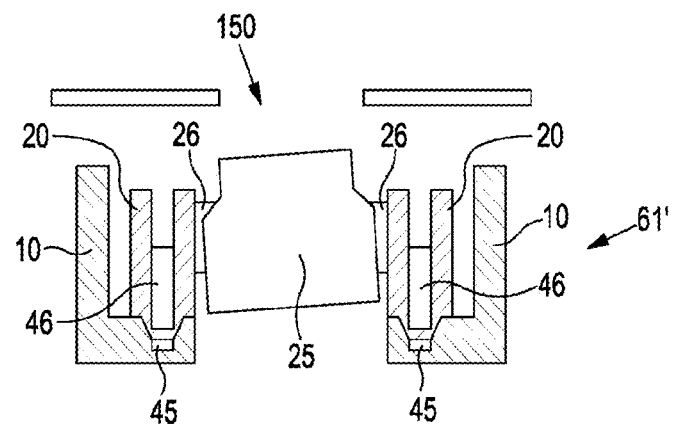

Referring to FIG. 11C, in this example, the magnetic elements 45, 46 are symmetrically arranged on the static part 10 and the lens holder 20. Hence, when the lens holder 20 is in the held position, the lens holder 20 generally has a different orientation relative to the primary axis P than it does at operational centre. Hence the lens assembly 25 is generally not parallel with the primary axis P when the lens holder 20 is in the held position. This may be at least partly compensated for by arranging the actuator assembly 61' relative to an aperture 150 (e.g. in the device in which it is to be included) such that the lens assembly 25 appears to be centered in the aperture 150 when the lens holder 20 is in the held position. This may require additional (adjustment) actions to be taken during assembly, which may be disadvantageous.

Sixth Example and Assembly Method

Figure 12A:
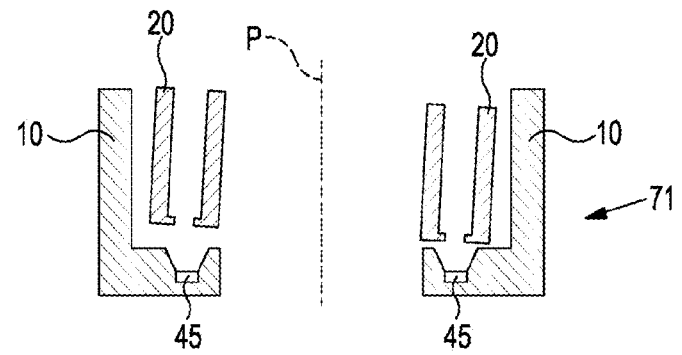
FIGS. 12A, B and C are schematic views of another example of a camera assembly at several different stages of assembly.
Figure 12B:
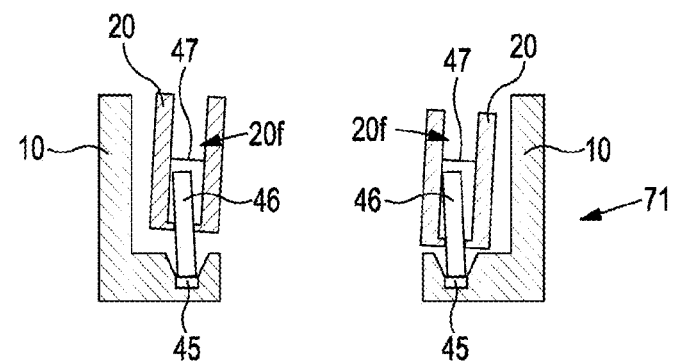
Figure 12C:
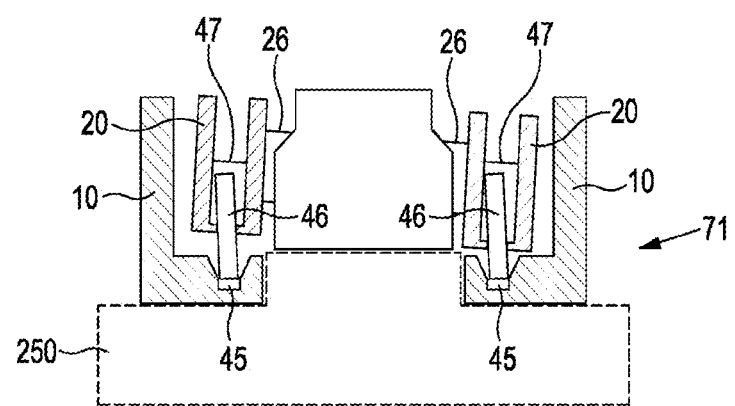

Referring to FIG. 12, a seventh example of an actuator assembly 71 and an example of a method involving assembly thereof will now be described.

The actuator assembly 71 includes the same or similar features as the sixth example 61. However, as will be explained in more detail below, the position and orientation of the magnetic elements 46 relative to the lens holder 20 can be adjusted during assembly.

At a first step (see FIG. 12A), the lens holder 20 is taken to the operational centre, as described above, and is then lowered to a position that will ultimately correspond to the held position in which the magnetic elements 45, 46 engage with each other. This lowering corresponds to movement along the primary axis P towards the static part 10 and is carried out without substantially changing the orientation of the lens holder 20 (i.e. is a translational movement). Such a movement can be performed by suitably powering the SMA wires 30.

In other examples, the lens holder 20 may be raised to a held position that is above the operational centre.

At a second step (see FIG. 12B), with the lens holder 20 held by the SMA wires 30 at the 'held' position, the magnetic elements 46 are introduced (if they have not already been so), arranged in a desired position and orientation, and attached to the lens holder 20.

In this example, the magnetic elements 46 (hereinafter referred to simply as 'magnets') are permanent magnets and are bar-shaped. Each magnet 46 and e.g. an amount of curable adhesive 47 are accommodated in a cavity 20f in the lens holder 20. The cavity 20f has a relatively large top opening to allow the magnet 46 and the adhesive 47 to be introduced into the cavity 20f. The cavity 20f has a relatively small lower opening through which the magnet 46 can pass in a range of orientations relative to the lens holder 20. In the desired position and orientation, each magnet 46 passes though the lower opening in the cavity 20f and engages with a corresponding magnetic element 45 on the static part 10. The magnets 46 may be attached to the lens holder 20 by way of e.g. a curable adhesive 47 which is cured at this stage.

The above-described first and second steps need not involve the lens assembly 25. In other words, they may correspond to actuator assembly steps rather than camera assembly steps. Moreover, these steps provide an actuator assembly 71 in which the position and orientation of the lens holder 20 at the operational centre is at least partly defined relative to the held position in which the magnetic elements 45, 46 are engaged with each other. In particular, the operational centre is a certain distance above (or below) the held position. As will now be explained, this enables the lens assembly 25 to be arranged in a desired position and orientation without having to selectively power the SMA wires 30, which can simplify the camera assembly process.

At a third step (see FIG. 12C), with the lens holder 20 held in the held position by the magnetic elements 45, 46, the lens assembly 25 is introduced (if it has not already been so), arranged in a desired position and orientation using a jig 250, and attached to the lens holder 20.

The desired position and orientation correspond to the lens assembly 25 being substantially parallel with the primary axis P and preferably in a substantially central lateral position relative to the primary axis P. Because the operational centre is a certain distance above the held position, the desired position of the lens assembly 25 at this stage is a corresponding distance below the operational centre. The jig 250 may have any suitable shape that achieves this position and orientation. The jig 250 may have an adjustable height or may be adjustably positionable so as to compensate for variations in the distance between the operational centre and the held position (which may have been recorded at a previous step). However, a certain amount of variation in the height of the lens assembly 25 may be acceptable, so such compensation may not be necessary. The lens assembly 25 may be attached to the lens holder 20 by way of a curable adhesive 26 which is cured at this stage.

Hence an assembly can be produced in which the lens assembly 25 is suitably aligned with (and may be centered on) the primary axis P both at an operational centre and in a held position.

Control and Calibration Methods

As described above, the drive signals to the SMA wires 30 may be generated by control circuitry using a resistance feedback technique.

Figure 13:
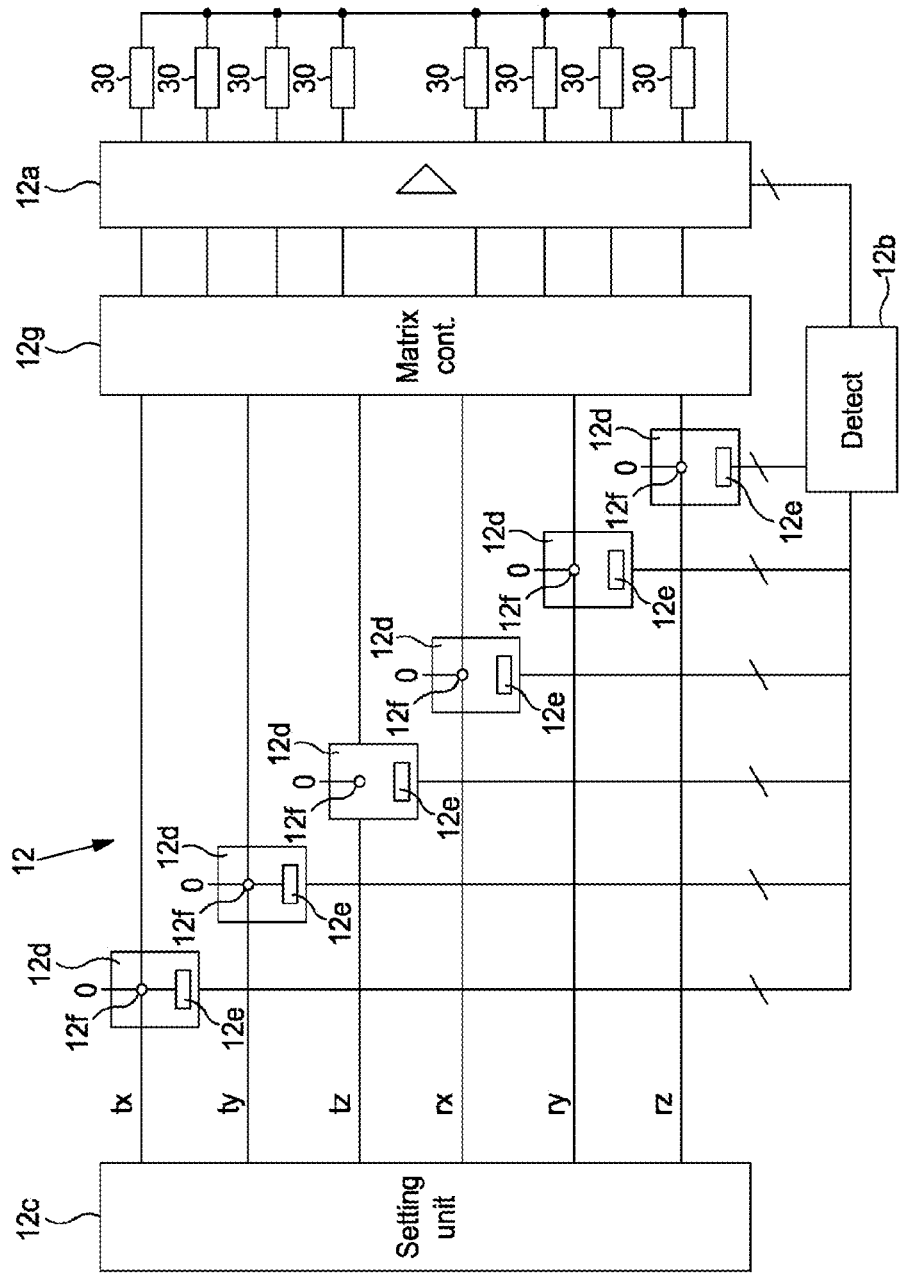
FIG. 13 is a schematic view of control circuitry which may be used in relation to any of the illustrated actuator assemblies.

Referring to FIG. 13, such circuitry and such a technique will now be briefly described. Further details are provided in WO 2017/098249 A1, which is incorporated herein by this reference. A related calibration method will then be described.

The control circuitry 12 includes drive circuitry 12a which generates a drive signal for each SMA wire 30 in accordance with a control signal for each SMA wire 30. The drive circuitry 12a may include a constant-voltage or constant-current source for each SMA wire 30. The drive signals generated by the drive circuitry 12a may be pulse-width modulation (PWM) signals.

The control circuitry 12 also includes detection circuitry 12b which detects measures of resistance of each of the SMA wires 30, the resistance of a wire being related to its length. Where the drive circuitry 12a includes constant-current sources, the detection circuitry 12b may include, for example, voltage-detection circuitry to detect the voltage across each SMA wire 30. Alternatively or additionally, the detection circuit 12b may include current-detection circuitry.

The control circuitry 12 also includes a setting unit 12c which sets target resistance values. A target resistance value can be set for each wire or for different combinations of wire resistances. Moreover, combinations of wire resistances can be selected which correspond to the degrees of freedom of the 3D movement of the lens holder 20 with respect to the static part 10. In the example which will now be described, a target resistance value is set in respect of each degree of freedom, i.e. tx, ty and tz (representing translational positions along x, y and z axes) and rx, ry and rz (representing rotational positions around x, y and z axes, wherein the z axis corresponds to the primary axis P). The setting unit 12c sets the target resistance values according to the desired position and orientation of the lens holder 20, for example to perform autofocus by varying tz and/or OIS by varying tx and ty, while keeping rx, ry and rz constant.

The control circuitry 12 also includes an error detector 12d for each of the degrees of freedom. Each error detector 12d is supplied with a respective one of the target resistance values, and the detected measures of resistance of the SMA wires 30.

Each error detector 12d includes a feedback measure unit 12e which determines feedback values for the relevant degree of freedom. The feedback values are linear sums of the detected measures of resistance of the SMA wires 30 with scaling factors that correspond to the contributions of the SMA wires 30 to movement in the relevant degree of freedom. This depends on the geometry of the SMA wires 30. For instance, the rotational position of the lens holder 20 around the x axis, rotx, may be a function of the length and hence the resistance R of four SMA wires 30 labelled a, b, e and f, Moreover, the SMA wires 30 may have a symmetrical configuration such that rotx=K×(Ra−Rb+Re−Rf), where K is a constant of proportionality.

Each error detector 12d also includes a comparator 12f which determines an error between the target resistance value and the feedback value for the relevant degree of freedom. The error is further adjusted by an offset O. In this example, the adjustment is applied by offsetting the error determined by the comparator 12f. However, it will be appreciated that the adjustment may be carried out in different ways e.g. by offsetting the target resistance value or the feedback value.

The adjusted errors are supplied from the error detectors 12d to a matrix controller 12g which determines the control signals for each SMA wire 30 so as to control the powers of the drive signals in accordance with the adjusted errors. The matrix controller 12g uses a closed loop control algorithm to reduce the adjusted errors.

As will be appreciated, the setting unit 12c, the error detectors 12d and the matrix controller 12g may be implemented in one or more processors (operating in common or independently).

The offsets O (referred to above) are for increasing the accuracy with which the actual positions and orientations of the lens holder 20 match target positions and orientations as represented by the target resistance values. For example, the offsets O are used to correct for variations in the actual positions and orientations to which the lens holder 20 is driven by the control circuitry 12 due to manufacturing tolerances or changes in the response of the SMA wires 30 over time.

The offsets O can be determined based on measurements of the resistance of the SMA wires 30 when the lens holder 20 is at a known position and/or orientation (hereinafter referred to as a calibration position) with respect to the static part 10.

As mentioned above, the resistances of the SMA wires 30 may be determined by applying a current to, and measuring the resistance of, the SMA wires 30. The resistances used to determine the offsets O may be the maximum resistance of each wire measured, or may be the resistance measured at a predetermined wire temperature, or at a predetermined time after starting to apply the current to the wire (in which case the predetermined time and/or the profile of the applied current may depend on the ambient temperature).

A suitable calibration position is one in which the optical axis of the camera lens 25 is normal to the image sensor and so an image is optimally in focus across the image sensor. Such a position is preferably determined during manufacture, e.g. using a planar image target which is arranged parallel to the image sensor. The resistance of each of the SMA wires 30 in this state can be measured and used to derive suitable offsets O. For example, a first offset, roff1, may be determined in relation to the rotational position of the lens holder 20 around the x axis, i.e. rotx. As will be appreciated, the sum of resistances of the relevant SMA wires 30, i.e. (Ra−Rb+Re−Rf), will generally be non-zero even in this calibration position. An offset for the rotational position, roty, of the lens holder 20 around the y axis may be determined in an equivalent way.

Another suitable calibration position corresponds to the above-described central arrangement, i.e. the position and orientation in which the lens holder 20 is held when the SMA wires 30 are unpowered.

The resistance of each of the SMA wires 30 at this calibration position can be measured at different times and used to compensate for variations in the actuator assembly that may occur over time. For example, such measurements may be made during manufacture and then subsequently, e.g. as part of a power up procedure before moving the lens holder 20 to an operational position. Accordingly, the calibration may be carried out without unduly interfering with normal operation.

For example, such measurements may be used to correct for variations in tilt relative to the z axis, i.e. rotations about the x and y axes (rotx and roty)

This may be carried out in an actuator assembly (not shown) which is a variation of the sixth example and includes:
(i) two magnetic elements in the form of permanent magnets on the lens holder 20 and two corresponding element in the form of metal plates on the static part 10; and
(ii) three or more end stop surfaces arranged such that, when the SMA wires 30 are unpowered, the resulting magnetic forces holds the lens holder 20 in a predetermined tilt relative to the z axis, which may be nominally zero (subject to manufacturing tolerances).

During manufacture, a measure of the absolute rotational position of the lens holder 20 in the central arrangement can be obtained. For example, in relation to the rotational position of the lens holder 20 around the x axis, i.e. rotx, this absolute position may correspond to the difference between the first offset, roff1, and a second offset, roff2, which is equal to K×(Ra−Rb+Re−Rf) and is determined based on the resistances of the relevant SMA wires 30 when the lens holder 20 is in the central arrangement.

Subsequent measurements of the resistances of the SMA wires 30 when the lens holder 20 is in the central arrangement may be used to determine any changes. For example, in relation to rotx, the subsequent measurements may be used to determine a third offset, roff3 (equivalent to the first and second offsets), and hence a total offset in rotational position, i.e. rtotal=(roff1+roff3−roff2).

A total offset for the rotational position of the lens holder 20 around the y axis, i.e. roty, may be determined in an equivalent way. Similar techniques may be used to obtain offsets O for one or more of the other degrees of freedom e.g. translational movement in the x, y and/or z directions.

These techniques may also be carried out in relation to any of the actuator assemblies described herein or variations of these actuator assemblies.

Other Variations

It will be appreciated that there may be many other variations of the above-described embodiments.

For example, the actuator assembly may be used in applications other than cameras.

Any reference to centring and/or aligning a lens holder 20 may instead be referring to centring and/or aligning a lens assembly 25 (which may be off-centered and/or misaligned with the lens holder 20).

Instead, of combinations of wire resistances corresponding to degrees of freedom, the control method may use any suitable target values, e.g. individual wire resistances. Furthermore, the offsets O may take any suitable form.

Offsets O need not be determined for each degree of freedom.

The offsets O may be used in different control methods, including different closed-loop techniques, and open-loop techniques.

The invention claimed is:

1. An actuator assembly comprising:
   first and second parts, wherein a primary axis is defined with reference to the second part;
   a plurality of lengths of shape-memory alloy wire connected between the first and second parts, wherein the lengths of wire are configured, when selectively powered, to cause three-dimensional movement of the first part relative to the second part, the three-dimensional movement including translational movement in three translational degrees of freedom; and
   a mechanism configured, when the lengths of wire are unpowered, to hold the first part in at least one position and/or orientation relative to the second part against the force of gravity for any orientation of the second part.

2. The actuator assembly according to claim 1, wherein the at least one position corresponds to a range of positions corresponding to at least a portion of the first part having moved by a distance of <100 μm from a central position relative to the second part.

3. The actuator assembly according to claim 2, wherein the distance is a lateral distance relative to the primary axis.

4. The actuator assembly according to claim 1, wherein the mechanism comprises:
   a set of one or more end stops formed on the second part; and
   a set of one or more resilient elements connected between the first and second parts to bias the first part such that, when the lengths of wire are unpowered, the first part moves into contact with the set of end stops.

5. The actuator assembly according to claim 4, wherein the set of end stops comprises a first set of surface regions configured to contact a first set of surface regions of the first part to control the orientation of the first part relative to the primary axis.

6. The actuator assembly according to claim 4, wherein the set of end stops comprises a second set of surface regions configured to contact a second set of surface regions of the first part to control the lateral position of at least a portion of the first part relative to the primary axis.

7. The actuator assembly according to claim 1, wherein the mechanism comprises a set of one or more resilient elements connected between the first and second parts to bias the first part towards the at least one position and/or orientation.

8. The actuator assembly according to claim 7, wherein at least one of the set of resilient elements extends in one or more directions that are at least partly perpendicular to the primary axis.

9. The actuator assembly according to claim 8, wherein the set of resilient elements comprises two or more resilient elements that are spaced from each other along the primary axis.

10. The actuator assembly according to claim 7, wherein the set of resilient elements produce a biasing force on the first part such that, for any orientation of the second part in which the primary axis is horizontal, at least a portion of the first part is a distance between 80 μm and 100 μm below a central position relative to the second part.

11. The actuator assembly according to claim 7, wherein one or more of the set of resilient elements form part of an electrical connection to a moving end of each of the lengths of shape-memory alloy wire.

12. The actuator assembly according to claim 1, wherein:
   the mechanism is configured to provide a non-linear biasing force that biases the first part towards the at least one position and/or orientation;
   the non-linear biasing force is relatively large when the first part is in the at least one position and/or orientation; and
   the non-linear biasing force is relatively small when the first part is in a range of positions and/or orientations associated with the three-dimensional movement of the first part.

13. The actuator assembly according to claim 12, wherein:

the mechanism comprises a latch that connects the first and second parts when the first part is in the at least one position and/or orientation; and the actuator assembly further comprises control circuitry configured, before unpowering the lengths of wire, to move the first part to a position and/or orientation relative to the second part in which the non-linear biasing force is relatively large and/or in which the latch engages.

14. The actuator assembly according to claim 12, wherein the mechanism is configured to provide a non-linear biasing force that is larger than the force of gravity on the first part for any operational position and orientation of the first part relative to the second part.

15. The actuator assembly according to claim 12, wherein;
the mechanism comprises a magnetic element on each of the first and second parts;
at least one of the magnetic elements comprises a permanent magnet; and
the magnetic elements are in proximity to each other when the first part is in the at least one position and/or orientation.

16. The actuator assembly according to claim 15, wherein the permanent magnet is a quadrupole magnet.

17. The actuator assembly according to claim 12, wherein the at least one position and/or orientation can be arrived at by a substantially translational movement of the first part along the primary axis from a central operational position and orientation of the first part relative to the second part.

18. A method of assembling an actuator assembly according to claim 17, the method comprising:
selectively powering the plurality of lengths of shape-memory alloy wire to move the first part to the at least one position and/or orientation; and
while holding the first part in the at least one position and/or orientation, fixing a position and/or orientation of at least a portion of the mechanism relative to first part.

19. The actuator assembly according to claim 12, wherein the first and second parts each comprise a first set of end stop surface regions configured to contact each other to guide the first part to the at least one position and/or orientation.

20. The actuator assembly according to claim 19, wherein:
the first and second parts each comprise a second set of end stop surface regions configured to contact each other to define at least part of a wire protection envelope; and the first set of end stop surface regions truncate the wire protection envelope such that the at least one position and/or orientation is within the wire protection envelope.

21. The actuator assembly according to claim 12, wherein the first and second parts each comprise a set of end stop surface regions configured to contact each other to at least partly define the position of the first part along the primary axis when the first part is in the at least one position and/or orientation.

22. The actuator assembly according to claim 21, wherein the mechanism is configured to provide a non-linear biasing force that guides the first part to the at least one position and/or orientation.

23. The actuator assembly according to claim 1, wherein the mechanism comprises a latch that connects the first and second parts when the first part is in the at least one position and/or orientation.

24. The actuator assembly according to claim 1, wherein the first part has first and second portions spaced from each other along the primary axis, and the at least one position and/or orientation corresponds to a range of positions and orientations in which the first portion generally has a smaller range of positions than the second portion.

25. A camera assembly comprising an actuator assembly according to claim 1, wherein the first part comprises a camera lens and the second part comprises an image sensor and wherein the primary axis corresponds to an optical axis of an optical system.

26. A method of operating an actuator assembly according to claim 1, the method comprising:
calibrating one or more offsets based on measurements of the resistance of one or more of the lengths of shape-memory alloy wire while the first part is in the at least one position and/or orientation,
wherein the offsets are for adjusting one or more aspects of a control scheme such that actual positions and/or orientations of the first part relative to the second part substantially match target positions and/or orientations in respect of at least one degree of freedom.

27. The method according to claim 26, further comprising carrying out the measurements of the resistance at least partly as part of a power up procedure and before moving the first part to an operational position.

* * * * *